(12) United States Patent
Bauer et al.

(10) Patent No.: US 6,947,383 B2
(45) Date of Patent: Sep. 20, 2005

(54) RADIO TELECOMMUNICATIONS SYSTEM WITH IMPROVED USE OF AIR INTERFACE

(75) Inventors: Norbert Allfred Bauer, Nuremberg (DE); Andrea Giustina, Swindon (GB); Martine Madelaine Herpers, Herzogenaurach (DE)

(73) Assignee: Lucent Technologies Inc., Murray Hill, NJ (US)

( * ) Notice: Subject to any disclaimer, the term of this patent is extended or adjusted under 35 U.S.C. 154(b) by 821 days.

(21) Appl. No.: 09/796,857

(22) Filed: Mar. 1, 2001

(65) Prior Publication Data

US 2001/0038621 A1 Nov. 8, 2001

(30) Foreign Application Priority Data

Mar. 7, 2000 (EP) .............................................. 00301874

(51) Int. Cl.[7] .............................................. H04L 12/26
(52) U.S. Cl. ...................................... 370/235; 370/328
(58) Field of Search .............................. 370/231, 235, 370/235.1, 236, 328, 389, 410, 232, 233, 234, 412, 429, 469

(56) References Cited

U.S. PATENT DOCUMENTS

| | | | |
|---|---|---|---|
| 5,570,360 A | 10/1996 | Klausmeier et al. | |
| 5,696,764 A | 12/1997 | Soumiya et al. | ............. 370/395 |
| 5,802,310 A | 9/1998 | Rajaraman | ............. 395/200.64 |
| 5,914,936 A | 6/1999 | Hatono et al. | ................ 370/230 |
| 6,236,656 B1 * | 5/2001 | Westerberg et al. | ...... 370/395.4 |
| 6,347,091 B1 * | 2/2002 | Wallentin et al. | ............ 370/437 |
| 6,374,112 B1 * | 4/2002 | Widegren et al. | ............ 370/352 |
| 6,374,117 B1 * | 4/2002 | Denkert et al. | .............. 455/522 |
| 6,407,999 B1 * | 6/2002 | Olkkonen et al. | ........... 370/389 |
| 6,574,201 B1 * | 6/2003 | Kreppel | ........................ 370/328 |
| 6,578,082 B1 * | 6/2003 | Ho et al. | ...................... 370/230 |
| 6,594,241 B1 * | 7/2003 | Malmlof | ....................... 370/329 |
| 6,711,143 B1 * | 3/2004 | Balazinski et al. | .......... 370/329 |
| 6,728,208 B1 * | 4/2004 | Puuskari | ................... 370/230.1 |
| 2001/0033563 A1 * | 10/2001 | Niemela et al. | ............. 370/349 |
| 2002/0044527 A1 * | 4/2002 | Jiang et al. | ................... 370/229 |

FOREIGN PATENT DOCUMENTS

| | | | | |
|---|---|---|---|---|
| EP | 0 647 081 A2 | 9/1994 | ........... | H04Q/11/04 |
| EP | 0 874 532 A2 | 4/1998 | ........... | H04Q/11/04 |
| WO | WO97/39555 | 10/1997 | ........... | H04L/12/56 |

* cited by examiner

*Primary Examiner*—Chi Pham
*Assistant Examiner*—Anh-Vu H Ly

(57) ABSTRACT

In a radio telecommunications system such as GSM in which a serving node operates the leaky bucket algorithm to control flow of packet data to a packet control unit and a virtual queue of data is formed in the control unit, upper and lower triggers BVC(u), BVC(l) are provided on the queue, and when the queue reaches the upper trigger, the packet control unit sends a request to the node to alter the leak rate R of the leaky bucket algorithm so as to reduce the data flow rate. When the lower trigger BVC(l) is reached, the control unit sends values of R and of Bmax, the maximum bucket size of the leaky bucket algorithm, to the node so that the length of the virtual queue is maintained close to the value of Bmax. Bmax is proportional to the number of allocated timeslots.

8 Claims, 2 Drawing Sheets

RADIO TELECOMMUNICATIONS SYSTEM WITH IMPROVED USE OF AIR INTERFACE

CROSS-REFERENCE TO RELATED APPLICATION

This application claims priority of European Patent Application No. 00301874.4, which was filed on Mar. 7, 2000.

1. Field of the Invention

This invention relates to a packet-based radio telecommunications system, such as GSM (Global System for Mobile Communications), having improved traffic control, especially over the air interface, and relates especially to a Packet Control Unit (PCU) in the Base Transceiver Station (BTS) having improved interworking with Mobile Stations (MSs) and with the Serving GPRS Support Node (SGSN).

2. Description of the Related Art

In a known packet-based system, a practical problem is that the PCU can only react on demand to packets received, and is not aware of traffic it will receive in future. The question is how to allocate resources on the air interface which carries GSM voice calls, control links, and timeslots. In current systems, the bit rate, the priority and the delay applied to each GPRS connection can be varied, but this requires considerable computing and messaging resources between the MS and the BTS, between the BTS and the PCU, and between the PCU and the SGSN.

SUMMARY OF THE INVENTION

This invention is directed toward optizimzing the usage of START radio resources without increasing the computing and signalling loads on the network elements or the MS.

A method of operating a radio telecommunications system is disclosed wherein a node operates to control flow of packet data to a local packet control unit which controls at least one radio telecommunications cell using a variable maximum bucket size Bmax and a variable leak rate R, and there being a virtual queue of data formed in the local control unit, a method of controlling data flow from the node to the local control unit is controlled by providing lower and upper trigger lengths on the virtual queue and sending a request to the node to alter the value of R when the virtual queue reaches the upper trigger so as to reduce the rate of data flow to the local control unit.

Also according to the invention, a packet control unit for a radio telecommunications system comprises a down link requests scheduler and a base station system virtual connection flow controller; where the base station system virtual connection (BVC) flow controller supports a data signalling queuing means provided with upper and lower timeslot triggers and with upper and lower BVC flow control triggers where both are at a greater queue length than the timeslot triggers.

BRIEF DESCRIPTION OF THE DRAWINGS

The features and advantages of the present invention will become more apparent from the detailed description set forth below when taken in conjunction with the drawings wherein.

DETAILED DESCRIPTION

Figure 1:
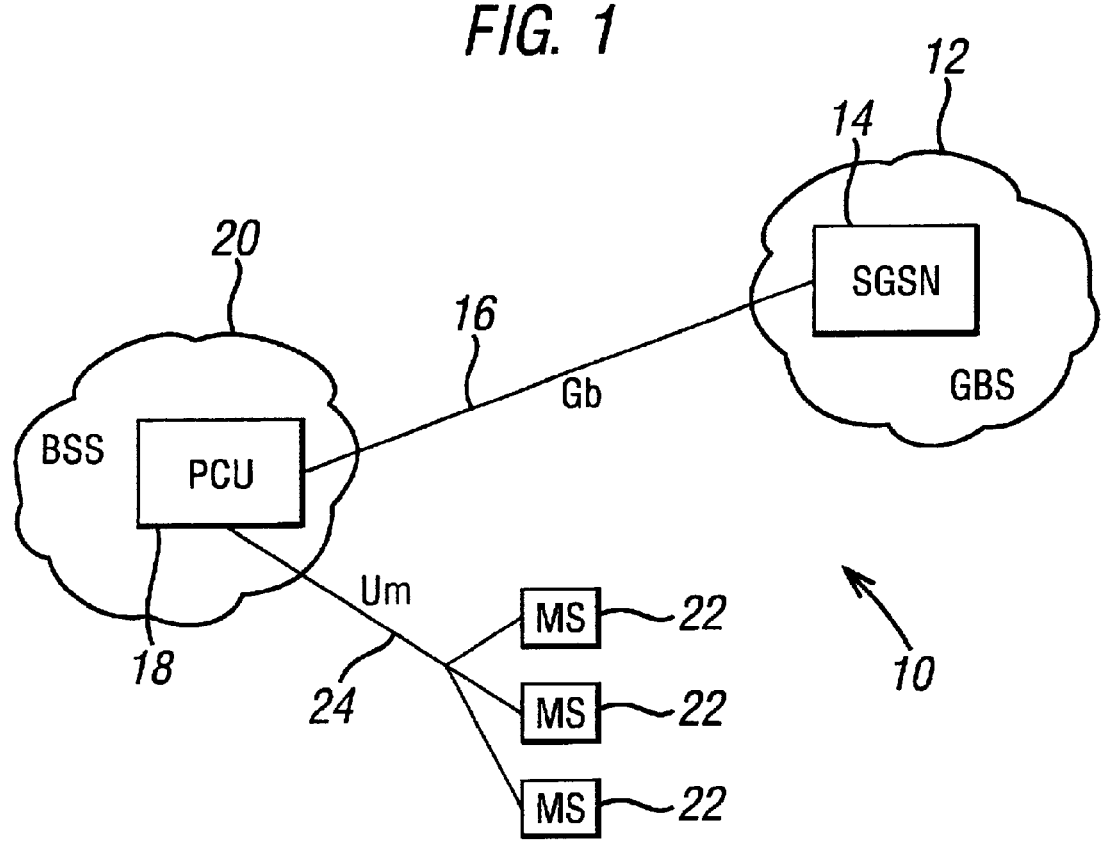
FIG. 1 is a schematic illustration of the base station part of a GPRS (General Packet Radio Service) radio telecommunications system.

In FIG. 1 a GPRS system 10 comprises a GPRS Backbone System (GBS) 12 containing a Serving GPRS Node (SGSN) 14 which is connected by an interface link Gb 16 to a Packet Control Unit (PCU) 18 within a Base Station System (BSS) 20. The PCU 18 is connected to a number of Mobile Systems (MS) 22 through an interface link Um 24.

Figure 2:
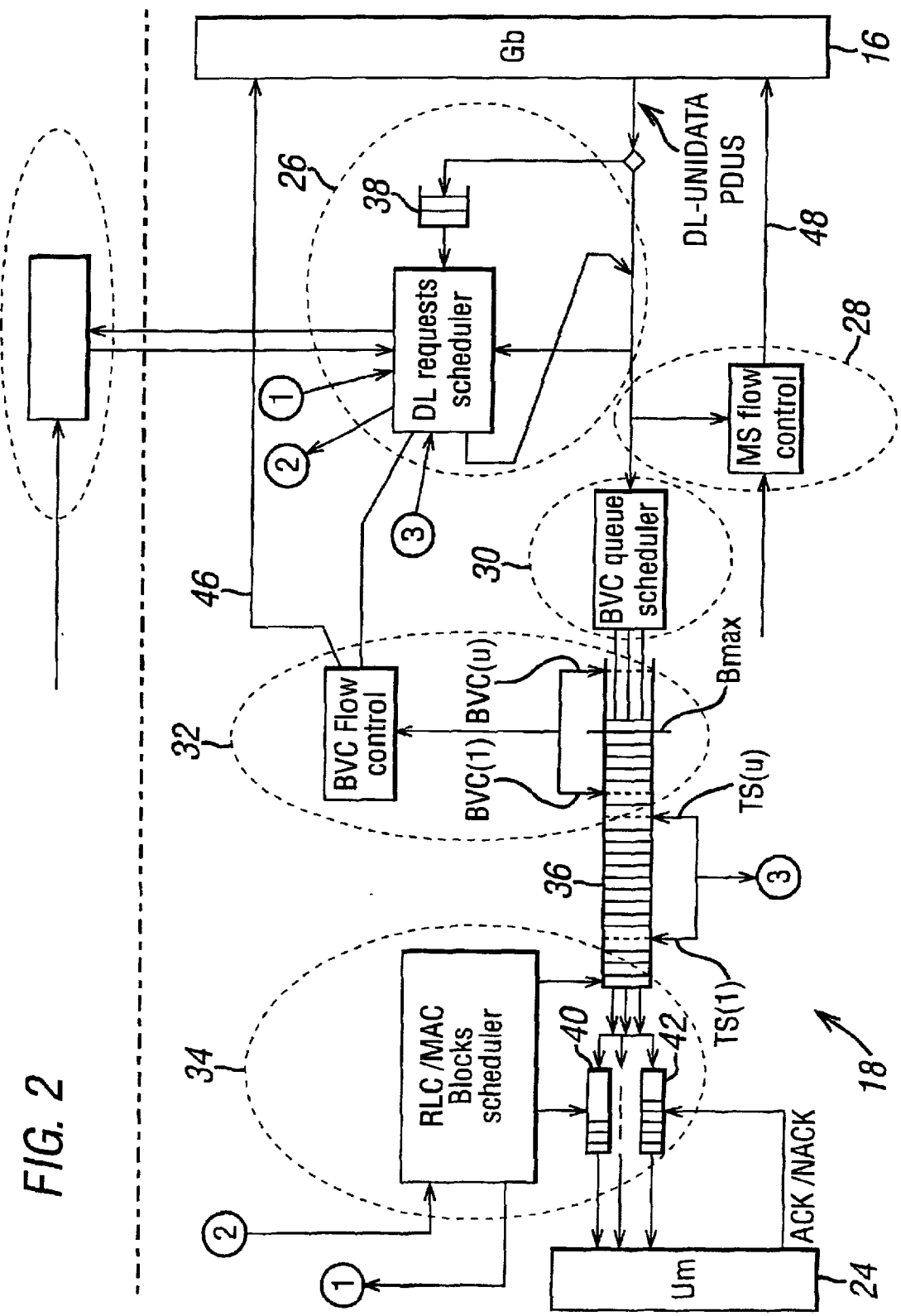
FIG. 2 is a schematic illustration of the packet control unit of a radio telecommunications system.

In FIG. 2 the PCU 18, the link Gb 16, and the link Um 24 are shown. Between the links 16 and 24 there is a Down Link (DL) requests scheduler 26, a MS flow control unit 28, a Base Station System Virtual Connection (BVC) queue scheduler 30; a BVC flow controller 32, and a Radio Link Control/Medium Access Control (RLC/MAC) blocks scheduler 34.

Although the uplink is not illustrated as it is not actively involved in application of the present invention, it will naturally exist.

In normal operation at normal traffic flow rates, a new call to a MS 22 is received over the Gb link 16, and the first Protocol Data Unit DL-UNITDATA PDU passes to the queue 38 of the DL requests scheduler 26. The scheduler 26 instructs the RLC/MAC blocks scheduler 34 to allocate capacity, and a Temporary Block Flow (TBF) queue, such as queue 42, is set up for the called mobile. Signals pass over the Um link 24 to the called mobile, which returns acknowledgement signals, ACK, over link 24 to the queue 42. The scheduler 34 fetches the next DL-UNJTDATA PDU which, because the MS is now known, passes through the BVC queue scheduler 30 into the BVC queue 36, and then to the appropriate TBF queue, queue 42 in this example.

The UNITDATA PDU corresponds to many messages and acknowledgements, and use of the RLC/MAC scheduler reduces the volume for the MS.

The scheduler 26 assigns logical resources to one of the TBF queues 40, 42, and instructs the RLC/MAC block scheduler, message(2)—(2). The processor 28 reads from the second DL-UNITDATA PDU the multi slot capacity of the mobile.

One TBF queue is allocated to each active MS. Every MS with an active TBF queue has two logical queues; one is for Logical Link Layer (LLC) data PDUs, and one is for LLC signaling PDUs. The length of the BVC queue 36 is the sum of all the MS queues including LLC data and signaling.

The BVC queue 36 is provided towards its output end with two timeslot triggers TS(l) and TS(u) which function in the conventional way, that is, if the queue 36 exceeds the upper timeslot trigger TS(u), the DL requests scheduler 36 sends a request via interface Gb 16 to the SGSN 14 for an additional timeslot to be allocated. If an additional timeslot is allocated, the queue shortens as traffic throughput is increased, and the queue length falls below the upper trigger TS(u). The signal from the queue 36 to the scheduler 26 is indicated as message (3)—(3).

In the arrangement of FIG. 2, the major components illustrated perform their conventional functions as follows:

The DL requests scheduler 26 allocates resources, ie. it decides which is the next MS 22 to be connected over the link 24; it requests additional timeslots when the timeslot trigger TS(u) is activated on connection (3)—(3), and it returns timeslots when they are no longer required.

The RLC/MAC blocks scheduler 34 allocates capacity, i.e. it allocates timeslots in response to instructions from the DL scheduler 36, message (2)—(2); it fetches the next DL PDU when the TBF queue 40, 42 for that MS is below a predetermined threshold (precedence is given to LLC signaling PDUs). The scheduler 34 also divides the LLC PDU into blocks, sets up transmission windows and retransmissions of blocks for each TBF queue 40, 42, and drops the TBF after a predetermined number of resent transmissions; on termination of a call it also signals the end of a TBF queue to the DL scheduler 36, message (1)—(1).

The DL requests scheduler 26 and the RLC/MAC blocks scheduler 34 are related as follows; the scheduler 26 assigns logical resources to each TBF queue 40, 42 on a per timeslot basis, ie. an allocation table is set up, while the scheduler 34 dynamically maps these logical resources to physical resources. Looked at another way, the scheduler 26 decides which mobile 22 will next be connected, and the scheduler 34 decides which block of information is sent to which mobile.

The BVC queue scheduler 30 selects the appropriate queue for a mobile system. It directs each DL-UNITDATA PDU to that queue. Each MS queue is divided into an MS data queue and an MS signaling queue—conveniently via use of two pointers in a common buffer.

Data flow over the Gb link 16 is controlled by use of the leaky bucket algorithm run within the SGSN 14 (FIG. 1). Values of Bmax, the maximum bucket capacity and R the leak rate, are calculated by both the BVC flow control processor 32 and the MS flow control processor 28 in different circumstances, and the values sent over the Gb link 16.

The following assumptions are made about the SGSN 14;

1. The MS flow control values sent to the SGSN by the MS flow control processor 28 are valid until the SGSN 14 receives a new valid MS flow control message or until the hysteresis timer Th expires. The PCU 18 knows the timer value which the SGSN is using, and is arranged to send a new MS flow control message every Th seconds less a short tolerance time.

2. If the SGSN 14 has not received an MS flow control message for a particular MS, the SGSN uses the default flow control values as sent in every BVC flow control message. The SGSN never uses internally generated MS flow control values, when the initial values are sent in the BVC flow control message.

3. The SGSN 14 sends the MS Radio Access Capability (a class mark) in each DL-UNITDATA PDU.

4. The SGSN 14 keeps (logical) separated queues for both MS flow control and BVC flow control.

Turning now to detailed consideration of the inventive feature, the BVC queue 36 is provided with two additional triggers, BVC(l) and BVC(u), at greater queue lengths than the timeslot triggers TS(l) and TS(u). Between BVC(l) and BVC(u) there is an intermediate queue length which is referenced Bmax in FIG. 2.

Suppose the upper timeslot trigger TS(u) is reached, and an additional timeslot is requested, but is not received; this may occur if all timeslots are occupied by voice calls, or if the PCU has already reached the maximum number of timeslots available, i.e., a whole cell is occupied so no additional timeslot can be allocated.

In these conditions the queue 36 is likely to grow and to exceed the position of BVC(l) trigger. When this trigger is reached, conditions will be referred to as congestion conditions.

If the queue continues to lengthen and reaches the upper trigger BVC(u), the BVC flow controller 32 then calculates the desired bit rate to be received from the SGSN using as inputs the queue length and the former bit rate value sent in the BVC flow control message, and sends a BVC flow control message over connection 46 through the interface Gb to the SGSN, requesting that data is sent at a lower bit rate. When the SGSN responds, the queue 36 shortens and may fall below the BVC lower trigger, when a further message is sent, increasing the bit rate.

Subsequently, either an additional timeslot may be allocated to the PCU, or traffic eases; in either case the length of the queue 36 will decrease and may go out of congestion conditions by falling below the lower trigger BVC(l), then below the trigger TS(u). The timeslot triggers then function in the conventional way.

It will be clear that the BVC triggers operate in real time, and that dynamic reaction to traffic conditions is achieved.

An advantage of this use of two sets of upper and lower triggers is that control of the SGSN 14 by the PCU 18 is light; the SGSN has priority of control in most circumstances, e.g. on GPRS delay on the down link, because it has information not available to the PCU. Further, the BVC triggers do not interfere with the timeslot triggers, by reason of the small gap between TS(u) and BVC(l).

Although the request queue 38, the BVC queue 36 and the TBF queues 40, 42 are shown as logically separate queues, in practice all three queues share the same physical space, and can be implemented as separate pointers in that space.

Considering now the operation of the four triggers on the BVC queue in more detail; the general concept is that of capacity on demand.

The DL scheduler 26 requests a new timeslot when either:
a) a certain ratio of served TBFs for a timeslot is reached, e.g. when there are already five active TBFs for each timeslot and a new request is received; or
b) the BVC queue reaches the upper timeslot trigger TS(u), or
c) when both conditions apply.

The objective of condition b), i.e. the position at which the upper timeslot trigger is set, is to have in the queue a new LLC-PDU for each TBF before the previous one has been transmitted; for example, to have an average of 1.5 LLC-PDUs for each TBF, which means that one LLC-PDU is queued and half of the previous one has been transmitted.

A typical value of the upper timeslot trigger is TS(u) *number of timeslots. The TS(u) value is chosen in order to limit the delay in the BSS avoiding at the same time the risk of early TBF termination.

As referred to above, the BVC flow control processor 32 sends intermittent flow control messages through Gb link 16 to the SGSN 14, the messages being the maximum BVC bucket size BVCBmax and the BVC leak rate R for use in the leaky bucket algorithm run by the SGSN 14.

In the arrangement according to the invention, the upper timeslot trigger TS(u) is activated before BVC control applies. It is now suggested that BVC Bmax calculated by the controller 32 is made proportional to the number of allocated timeslots, i.e., it is unchanged so long as the number of timeslots/packet data channels is unchanged. It is also now possible for real-time BVC flow control to be exerted only by changing the value of R.

An objective of the BVC flow control algorithm is to have an amount of data equal to Bmax in the BVC queue 36 during congestion conditions; effectively, the queue length oscillates about the length equal to Bmax. As a result of this, the TS(u) remains active and the system keeps on asking for a further slot or further capacity, and the queue length is controlled, and the delay in the BSS is also controlled.

Considering now some appropriate values; the distance between TS(u) and BVC(l) is set equal to the average size of an LLC PDU, and so is the distance between the TS(l) and BVCBmax.

A value of BVCBmax can then be set as:

*BVC B*max(for a *PDCH*)=(*TS*(*u*)+average *LLC PDU*length*2)+ 10%

(10% is added to maintain reasonable tolerance)

As stated above, an objective of the BVC flow control algorithm run by the BVC flow control processor 32 is to have the amount of data equal to Bmax in the BVC queue 36 during congestion conditions. The results are that:

1) Controlling the queue so that it is no longer than Bmax (with some tolerance) means that the delay introduced in the BSS on average is no longer than Bmax/ ((average bit rate for a timeslot)* number of timeslots). Bmax is proportional to the number of timeslots, so that delay=Bmax for a timeslot/average bit rate for a timeslot 2) Controlling the queue so that it is no shorter than Bmax (with some tolerance) means that the timeslot upper trigger for requesting a new timeslot is always active.

Since the value of Bmax is proportional to the number of timeslots, the BVC flow control can be exerted by means of the leak rate R.

The maximum value of R, i.e., the maximum bit rate which a BVC can support is equivalent to the maximum capacity of a PDCH. The minimum R, i.e., the minimum bit rate which a BVC can support is equivalent to the minimum capacity of a PDCH. The optimal value of R will be 10 or 20% lower than the maximum.

The actual value of R will vary between the maximum and minimum, and it is suggested that for every change in the number of channels, the value of R sent in the BVC flow control message is the optimal R multiplied by the number of channels, thus:

*BVC R*=optimal value of *R**(number of *PDCH*s)

If the real bit rate is lower, the PCU 18 will provide a new flow control message. Using the value set out above, the PCU can be sure that the SGSN 14 will send enough data to activate the upper timeslot trigger.

Turning now to the positions of the BVC upper and lower triggers, these can be set as the value of Bmax plus and minus 20%.

When the trigger is triggered, the PCU 14 must react by sending a value of R which allows the queue 36 to equal the size of Bmax within x seconds, where x is called the converging period; the converging period should never be shorter than the C timer, but should not be too short in order to avoid a sharp movement in the opposite direction; also the period should not be too long.

The BVC flow control process uses the old value of R and the elongation in the queue length (queue length minus Bmax) as a basis for calculating the new value of R; this has the advantage of avoiding any reference to the actual bit rate over the Um interface 24. The new value of R should allow the queue to return to equal Bmax within the converging period, but must never be higher than a maximum R or lower than the minimum R in order to avoid sharp changes in queue length. A new value for R is given by:

new *R*=max[min[old *R*+((*B*max−*B*)*8/(converging period)), Maximum *R*], Minimum *R*]

where (Bmax−B)*8 is the queue elongation in bits.

Consider now a change in the number of PDCHs. If a channel is added, the PCU 14 will have more capacity on the link 24, so there will be no problems in managing the queues. If a channel is released, the PCU has ensured both that the queue is really short (below the lower timeslot trigger) and that the arrival rate from the SGSN 14 can be served with one channel fewer. In both cases, the trigger for a new BVC flow control message must not be too fast so that the situation stabilizes. Waiting for some seconds and then reevaluating B and R reduces the risk of starting an elongation in queue length.

Further, it is advantageous to avoid sending a new BVC flow control message too quickly after a previous message. A BVC flow control check timer can be used, equal to or higher than the C timer, and preferably at least half of the converging period. The arrangement is such that while this timer is running, no check is performed on BVC triggers.

Taking an overall view, the BVC flow controller 32 operates in two phases:

A) Initialization: this is necessary when the BVC connection is created, after a reset or an unblocking procedure. The PCU 18 sends a BVC flow control message the SGSN 14; at this point the PCU 18 has no timeslots, thus flow control values are very close to zero.

B) Real time: the PCU needs to control the actual bit rate from the SGSN 14 on the Gb link 16, and the bit rate is adjusted by sending new values of B and R to the SGSN. Such a message is sent when either:

a) the PCU 18 adds or releases timeslots, when the BVC flow control is used to avoid buffer overload or lack of data to send. The PCU can use fixed values related to the number of allocated timeslots, so no heavy computation is required

OR b) congestion conditions apply, i.e., the BVC upper trigger has been activated as described above.

The DL scheduler 26 releases a timeslot when it is no longer needed. For example, if the PCU has a single timeslot, the last timeslot in the cell can be released after the last TBF has been deactivated, plus a hysteresis time, provided there are no more LLC-PDUs waiting to be transmitted. Consideration also needs to be given to the distribution of active TBFs; it may be more efficient to retain the timeslot and reallocate TBFs to timeslots to give a more even distribution, i.e., avoiding eightTBFs in one timeslot and one TBF in another timeslot.

By application of the invention, the operation of the SGSN 14 is limited only when absolutely necessary, by means of dynamic resource allocation. Only whole timeslots are used, never part of a timeslot. Such a timeslot is allocated dynamically in both the GSM voice services and in GPRS, and by application of the invention, the allocation is made efficient.

While this invention has been particularly shown and described with reference to a preferred embodiment thereof, it will be understood by those skilled in the art that various changes and modifications in form and details may be made without departing from the scope and spirit of the invention as defined in the appended claims. Accordingly, it is intended that the appended claims cover any such modifications or embodiments that fall within the scope of the invention.

What is claimed is:

1. A method of controlling data flow from a node to a local packet control unit controlling at least one radio telecommunications cell using a variable maximum bucket size Bmax and a variable leak rate R, and there being a virtual queue of data formed in the control unit, comprising the steps of providing lower and upper triggers on the virtual queue;

sensing when the virtual queue reaches the upper trigger; and sending to the node a request to alter the value of R so as to reduce the rate of data flow to the local control unit, the method further comprising: the steps of sensing when the virtual queue reaches the lower trigger; and sending to the node a request to alter the value of R such that the length of the virtual queue is maintained close to the value of Bmax.

2. The method of claim 1 in which the value of Bmax is proportional to the number of timeslots allocated by the node to the local control unit.

3. The method of claim 2 further comprising the step of requesting the node 14 to allocate an additional time slot to the local control unit when the virtual queue is longer than the upper trigger and/or the number of temporary block flow queues per time slot allocated to the local control unit exceeds a predetermined threshold.

4. The method of claim 3 further comprising the step of the local control unit sensing when the last temporary block flow queue for a timeslot has been released and whether that timeslot is the last GPRS timeslot in the cell, and the local control unit then releasing said last timeslot.

5. The method of claim 4 in which when there is more than one GPRS timeslot allocated to said local control unit, the local control unit releases a timeslot when it senses that the queue length is lower than the timeslot lower trigger, and the number of temporary block flow queues per timeslot, when calculated on the basis of one timeslot less than the number currently allocated, is lower than a predetermined threshold, and the arrival rate of data from the node is lower than the arrival rate which can be supported by one timeslot less than the number currently allocated.

6. The method of claim 5 in which the local control unit is further provided with upper and lower timeslot triggers at a queue length lower than the upper and lower BVC triggers, and when the queue length is greater than the upper timeslot trigger, and a new timeslot cannot be allocated, the local control unit maintains the length of the virtual queue at a value higher than the upper timeslot trigger.

7. A packet control unit for a radio telecommunications system comprising a base station system virtual connection flow controller having a data signaling queuing means provided with upper and lower timeslot triggers, TS(u), TS(l) and with upper and lower BVC flow control triggers BVC(u), BVC(l), both at a greater queue length than the timeslot triggers and wherein the base station system virtual connection flow controller is arranged to send a data limitation request message to a serving node of the system only when the packet control unit is in congestion conditions or when there is a change in the number of allocated timeslots.

8. The packet control unit of claim 7 in which when the queue length is above the lower additional trigger BVC(l), the queue length is arranged to oscillate about a value Bmax between the upper and lower triggers.

* * * * *